(No Model.)
F. T. VERHAREN.
FISH HOOK DISGORGER.
No. 498,094. Patented May 23, 1893.
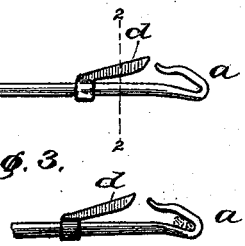
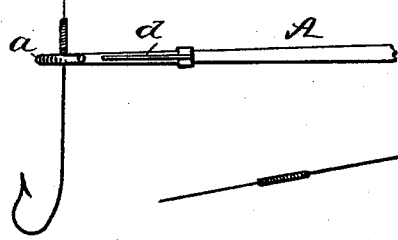
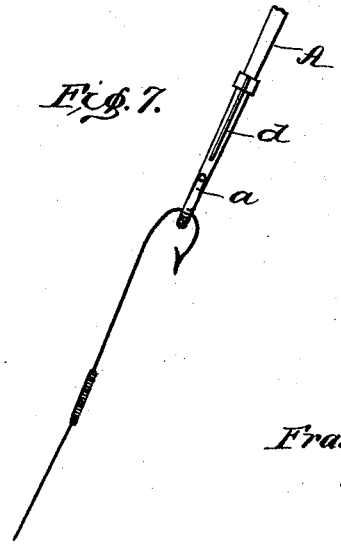
WITNESSES:
Fred G. Dieterich
Amos W. Hart
INVENTOR
Frank T. Verharen
BY Munn & Co.
ATTORNEYS.

UNITED STATES PATENT OFFICE.

FRANK T. VERHAREN, OF SPENCER, IOWA.

FISH-HOOK DISGORGER.

SPECIFICATION forming part of Letters Patent No. 498,094, dated May 23, 1893.

Application filed October 4, 1892. Serial No. 447,846. (No model.)

*To all whom it may concern:*

Be it known that I, FRANK T. VERHAREN, of Spencer, in the county of Clay and State of Iowa, have invented a new and Improved Fish-Hook Disgorger, of which the following is a specification.

My improved device for extracting hooks from the mouths of fishes consists of a hook having a shank whose length is sufficient to adapt it to be grasped by and held in the hand of the angler, and a guard which is in the nature of a short finger or bar, rigidly attached to said shank contiguous to the aforesaid hook, whereby it serves to prevent the latter from catching in the membranes of the fish's mouth while a fish-hook is being dislodged.

The construction and manner of using the tool are as hereinafter described and shown in accompanying drawings, in which—

Figure 1 is a side view of the disgorger, normal size. Fig. 2 is a cross section on line 2—2 of Fig. 1. Fig. 3 is sectional view—enlarged—showing the application of the tool to hooks of different sizes. Fig. 4 is a side view showing a modification of the guard. Figs. 5, 6 and 7 are views illustrating the practical use of the tool.

The straight shank, A, has at its reduced end a hook $a$, while its opposite or butt end $b$, is bent or coiled upon itself to form a handle. The said hook $a$, has an acute angle, which adapts it to fit closely upon fish-hooks whose shanks are of different diameters—as shown in Fig. 2—and the free arm of the hook has an inward bend near its extremity, which latter is turned outward to facilitate the application of the hook, $a$, to the fish-line or hook. The inward bend, or curve, narrows the cavity, or opening, of the hook, $a$, so that the tissue or membrane of the fish's mouth is prevented from crowding the fish-hook out of the mouth in the disgorging operation.

In practical use, the hook $a$, is caught around the fish-line $d$, or fish-hook $a$ as shown in Fig. 4, and the tool and line are then parallel laterally in opposite directions, as shown in Fig. 5, whereby the hook $a$, is caused to press upon and hold back the flesh or tissues in which the fish-hook is embedded, while the latter is being drawn up through and turned partly out of the same. In the next position, the tool is held in oblique alignment with the line—as shown in Fig. 6—and then jerked upward with slight force, whereby the fish is caused to drop off the barbed hook. Thus the disgorgement is effected without requiring the fish to be held, pulled, or otherwise manipulated manually. In this operation, the guard or shield $d$, performs an important function. It consists of a small blade or bar which is rigidly attached to and lies parallel with the shank of the tool, its free end being separated from the extremity of the hook by a narrow space, as shown. The guard prevents the end of the hook $a$, from catching in the tissue or membrane of the fish's mouth, so that the disengagement of the fish-hook is not thereby hindered, as would otherwise frequently be the case.

I show in Fig. 3, a modification of the guard, it being a knob or short finger $d'$ which projects radially from the shank A, in contiguity to the extremity of the hook $a$.

What I claim is—

1. The improved fish-hook disgorger composed of a shank A, provided at one extremity with a hook $a$, and a guard which is located contiguous to said hook, and rigidly attached to the shank, and projects therefrom at a point contiguous to the end of the hook substantially as shown and described.

2. The improved fish-hook disgorger composed of a shank A, provided at one extremity with a hook $a$, and a contiguous guard which consists of a bar arranged parallel with and rigidly attached to said shank, its free end being opposite to and contiguous to the extremity of the hook, as shown and described.

FRANK T. VERHAREN.

Witnesses:
FRANK RICHARDSON,
HARLAN J. BUCK.